(12) United States Patent
Goleski et al.

(10) Patent No.: US 8,545,362 B1
(45) Date of Patent: Oct. 1, 2013

(54) MULTI-SPEED TRANSMISSION

(75) Inventors: Gregory Daniel Goleski, Rochester Hills, MI (US); Reid Alan Baldwin, Howell, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/480,960

(22) Filed: May 25, 2012

(51) Int. Cl.
*F16H 3/62* (2006.01)

(52) U.S. Cl.
USPC .......................................... 475/277; 475/282

(58) Field of Classification Search
USPC .......................................... 475/277, 282, 288
See application file for complete search history.

(56) References Cited

U.S. PATENT DOCUMENTS

| 6,053,839 | A | 4/2000 | Baldwin et al. | |
|---|---|---|---|---|
| 7,789,792 | B2 | 9/2010 | Kamm et al. | |
| 8,007,394 | B2 | 8/2011 | Phillips et al. | |
| 8,231,495 | B2 | 7/2012 | Gumpoltsberger et al. | |
| 8,251,855 | B2* | 8/2012 | Diosi et al. | 475/277 |
| 8,303,455 | B2 | 11/2012 | Gumpoltsberger et al. | |
| 2004/0121877 | A1* | 6/2004 | Lee et al. | 475/282 |
| 2009/0088289 | A1* | 4/2009 | Baldwin | 475/276 |
| 2012/0053008 | A1 | 3/2012 | Beck et al. | |

OTHER PUBLICATIONS

H. Benford, M. Leising, The Lever Analogy: A New Tool in Transmission Analysis, 1982, Society of Automotive Engineers, Inc. 810102, p. 429-437.

* cited by examiner

*Primary Examiner* — Edwin A Young
(74) *Attorney, Agent, or Firm* — James Dottavio; Brooks Kushman, P.C.

(57) ABSTRACT

A family of transmission gearing arrangements produces up to ten forward and one reverse speed ratios by selective engagement of various combinations of three or four clutches. Each disclosed transmission includes four planetary gear sets and six clutches. Two of the clutches can be brakes.

19 Claims, 3 Drawing Sheets

MULTI-SPEED TRANSMISSION

TECHNICAL FIELD

This disclosure relates to the field of automatic transmissions for motor vehicles. More particularly, the disclosure pertains to an arrangement of gears, clutches, and the interconnections among them in a power transmission.

BACKGROUND

Many vehicles are used over a wide range of vehicle speeds, including both forward and reverse movement. Some types of engines, however, are capable of operating efficiently only within a narrow range of speeds. Consequently, transmissions capable of efficiently transmitting power at a variety of speed ratios are frequently employed. When the vehicle is at low speed, the transmission is usually operated at a high speed ratio such that it multiplies the engine torque for improved acceleration. At high vehicle speed, operating the transmission at a low speed ratio permits an engine speed associated with quiet, fuel efficient cruising. Typically, a transmission has a housing mounted to the vehicle structure, an input shaft driven by an engine crankshaft, and an output shaft driving the vehicle wheels, often via a differential assembly which permits the left and right wheel to rotate at slightly different speeds as the vehicle turns.

SUMMARY OF THE DISCLOSURE

A transmission is disclosed having four gearing arrangements which can be, for example, simple planetary gear sets. The gearing arrangements constrain the speeds of various rotating members. A first gearing arrangement fixedly constrains an input shaft to rotate at a speed between the speeds of a first element and a second element. A second gearing arrangement fixedly constrains an output shaft to rotate at a speed between the speeds of a third element and a fourth element. A third gearing arrangement selectively constrains an intermediate shaft to rotate at a speed between the speeds of the second element and the third element. Finally, a fourth gearing arrangement selectively constrains the fourth element to rotate at a speed less than the speed of the first element. Six clutches selectively couple gear elements to each other, to the input shaft, to the intermediate shaft, or to a transmission case. Engaging the clutches in various combinations establishes ten forward speed ratios and one reverse speed ratio.

In one embodiment, three of the clutches form a clutch module in which each of the three clutches selectively couple the intermediate shaft to a different gear element. Engaging the clutches in the module in combinations of two couples various pairs of gear elements. In another embodiment, three of the clutches form a clutch module in which each of the three clutches selectively couple two gear elements directly to each other.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

A gearing arrangement is a collection of rotating elements and clutches configured to impose specified speed relationships among elements. Some speed relationships, called fixed speed relationships, are imposed regardless of the state of any clutches. A gearing arrangement imposing only fixed relationships is called a fixed gearing arrangement. Other speed relationships are imposed only when particular clutches are fully engaged. A gearing arrangement that selectively imposes speed relationships is called a shiftable gearing arrangement. A discrete ratio transmission has a shiftable gearing arrangement that selectively imposes a variety of speed ratios between an input shaft and an output shaft.

A group of elements are fixedly coupled to one another if they are constrained to rotate as a unit in all operating conditions. Elements can be fixedly coupled by spline connections, welding, press fitting, machining from a common solid, or other means. Slight variations in rotational displacement between fixedly coupled elements can occur such as displacement due to lash or shaft compliance. In contrast, two elements are selectively coupled by a clutch when the clutch constrains them to rotate as a unit whenever the clutch is fully engaged and they are free to rotate at distinct speeds in at least some other operating condition. Clutches include actively controlled devices such as hydraulically or electrically actuated clutches and passive devices such as one way clutches. A clutch that holds an element against rotation by selectively connecting the element to the housing may be called a brake.

Figure 1:
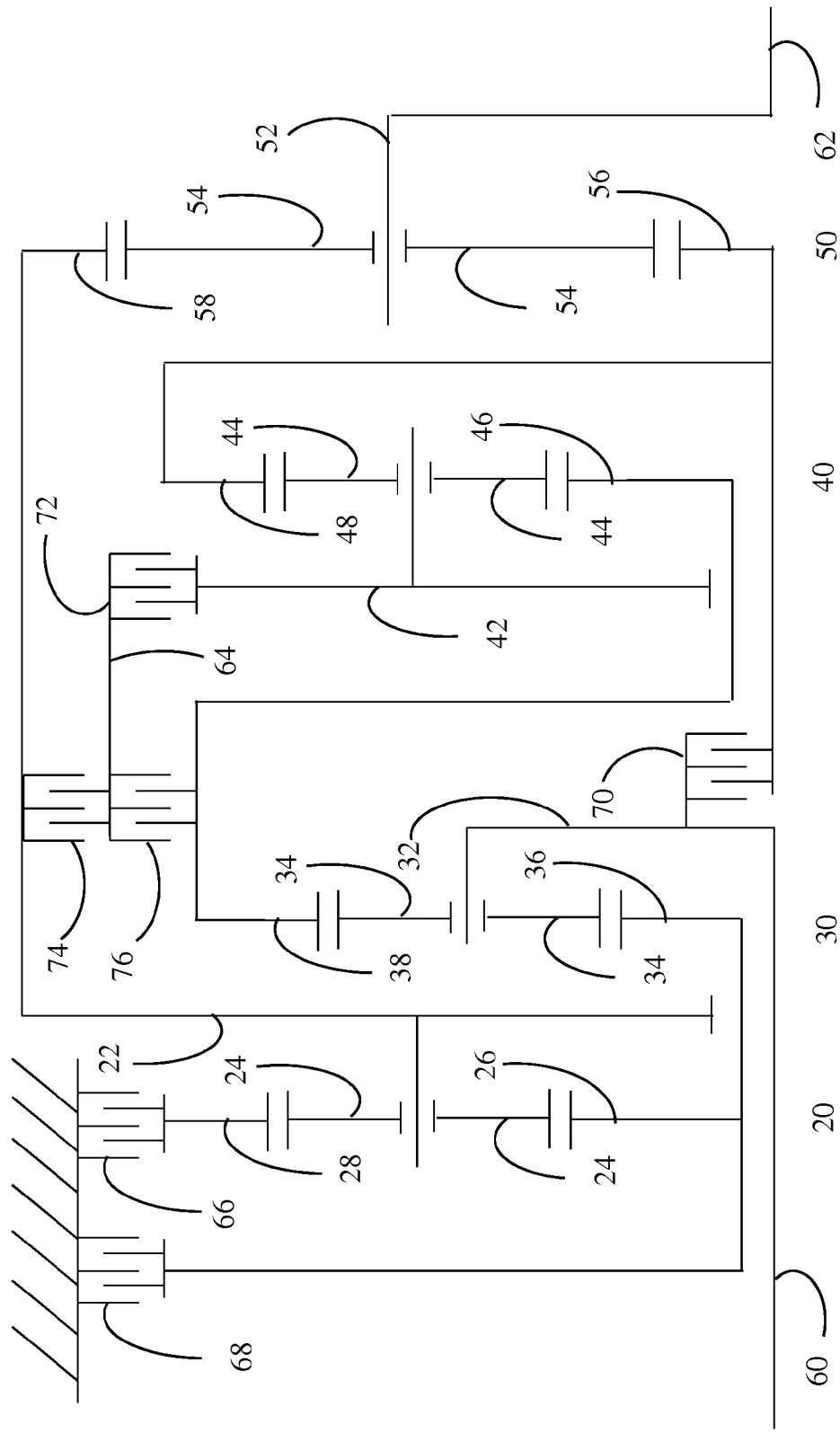
FIG. 1 is a schematic diagram of a first transmission gearing arrangement.

An example transmission is schematically illustrated in FIG. 1. The transmission utilizes four simple planetary gear sets 20, 30, 40, and 50. A simple planetary gear set is a type of fixed gearing arrangement. A planet carrier 22 rotates about a central axis and supports a set of planet gears 24 such that the planet gears rotate with respect to the planet carrier. External gear teeth on the planet gears mesh with external gear teeth on a sun gear 26 and with internal gear teeth on a ring gear 28. The sun gear and ring gear are supported to rotate about the same axis as the carrier. A simple planetary gear set imposes a fixed speed relationship. The speed of the carrier is constrained to be between the speed of the sun gear and the speed of the ring gear. (This relationship is defined to include the condition in which all three rotate at the same speed.) More specifically, the speed of the carrier is a weighted average of the speed of the sun gear and the speed of the ring gear with weighting factors determined by the number of teeth on each gear. Similar speed relationships are imposed by other known types of fixed gearing arrangements. For example, a double pinion planetary gear set constrains the speed of the ring gear to be a weighted average between the speed of the sun gear and the speed of the carrier. Gear sets 30, 40, and 50 are similarly structured.

A suggested ratio of gear teeth for each planetary gear set is listed in Table 1.

TABLE 1

| | |
|---|---|
| Ring 28/Sun 26 | 2.20 |
| Ring 38/Sun 36 | 1.75 |
| Ring 48/Sun 46 | 1.60 |
| Ring 58/Sun 56 | 3.70 |

In the transmission of FIG. 1, sun gear 26 is fixedly coupled to sun gear 36, carrier 22 is fixedly couple to ring gear 58, ring gear 38 is fixedly coupled to sun gear 46, ring gear 48 is fixedly coupled to sun gear 56, input shaft 60 is fixedly coupled to carrier 32, and output shaft 62 is fixedly coupled to carrier 52. Ring gear 28 is selectively held against rotation by brake 66 and sun gears 26 and 36 are selectively held against rotation by brake 68. Input shaft 60 is selectively coupled to ring gear 48 and sun gear 56 by clutch 70. Intermediate shaft 64 is selectively coupled to carrier 42 by clutch 72, selectively coupled to carrier 22 and ring gear 58 by clutch 74, and selectively coupled to ring gear 38 and sun gear 46 by clutch 76.

As shown in Table 2, engaging the clutches and brakes in combinations of four establishes ten forward speed ratios and one reverse speed ratio between input shaft 60 and output shaft 62. An X indicates that the clutch is required to establish the speed ratio. An (X) indicates the clutch can be applied but is not required. In $1^{St}$ gear, either clutch 74 or clutch 76 can be applied instead of applying clutch 72 without changing the speed ratio. When the gear sets have tooth numbers as indicated in Table 1, the speed ratios have the values indicated in Table 2.

TABLE 2

| | 66 | 68 | 70 | 72 | 74 | 76 | Ratio | Step |
|---|---|---|---|---|---|---|---|---|
| Rev | X | X | | X | X | | −4.79 | 102% |
| $1^{st}$ | X | X | X | (X) | 4.70 | | | |
| $2^{nd}$ | X | X | | X | | X | 2.99 | 1.57 |
| $3^{rd}$ | X | | X | X | | X | 2.18 | 1.37 |
| $4^{th}$ | X | | | X | X | X | 1.80 | 1.21 |
| $5^{th}$ | X | | X | | X | X | 1.54 | 1.17 |
| $6^{th}$ | X | | X | X | X | | 1.29 | 1.19 |
| $7^{th}$ | | | X | X | X | X | 1.00 | 1.29 |
| $8^{th}$ | | X | X | X | X | | 0.85 | 1.17 |
| $9^{th}$ | | X | X | | X | X | 0.69 | 1.24 |
| $10^{th}$ | | X | | X | X | X | 0.64 | 1.08 |

Figure 2:
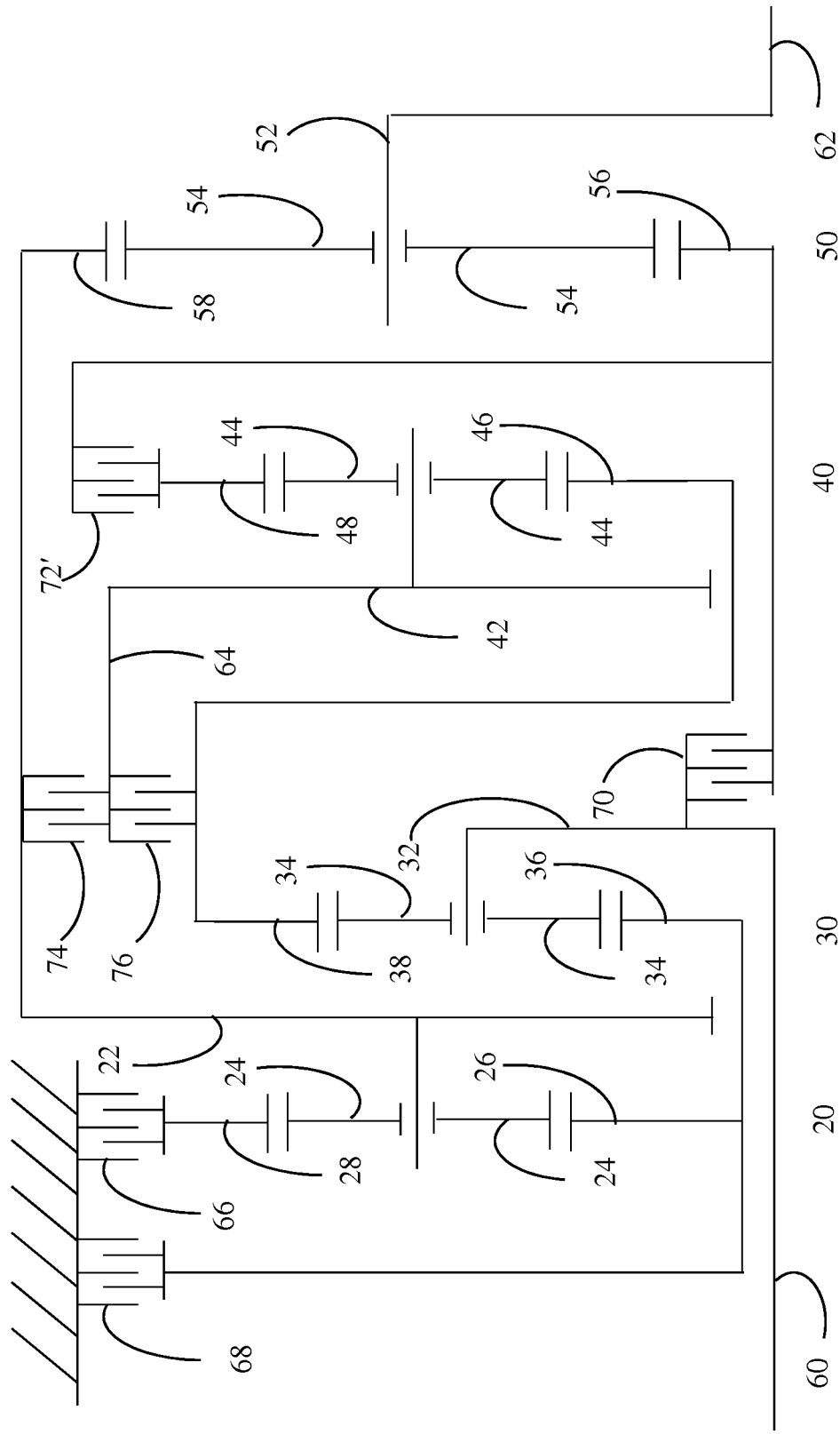
FIG. 2 is a schematic diagram of a second transmission gearing arrangement.

Another example transmission is illustrated in FIG. 2. In this transmission, intermediate shaft 64 is fixedly coupled to carrier 42 and ring gear 48 is selectively coupled to sun gear 56 by clutch 72'. The remaining features are as described with regard to the transmission of FIG. 1. Clutch 72' is applied in the same ratios as clutch 72 of FIG. 1.

Figure 3:
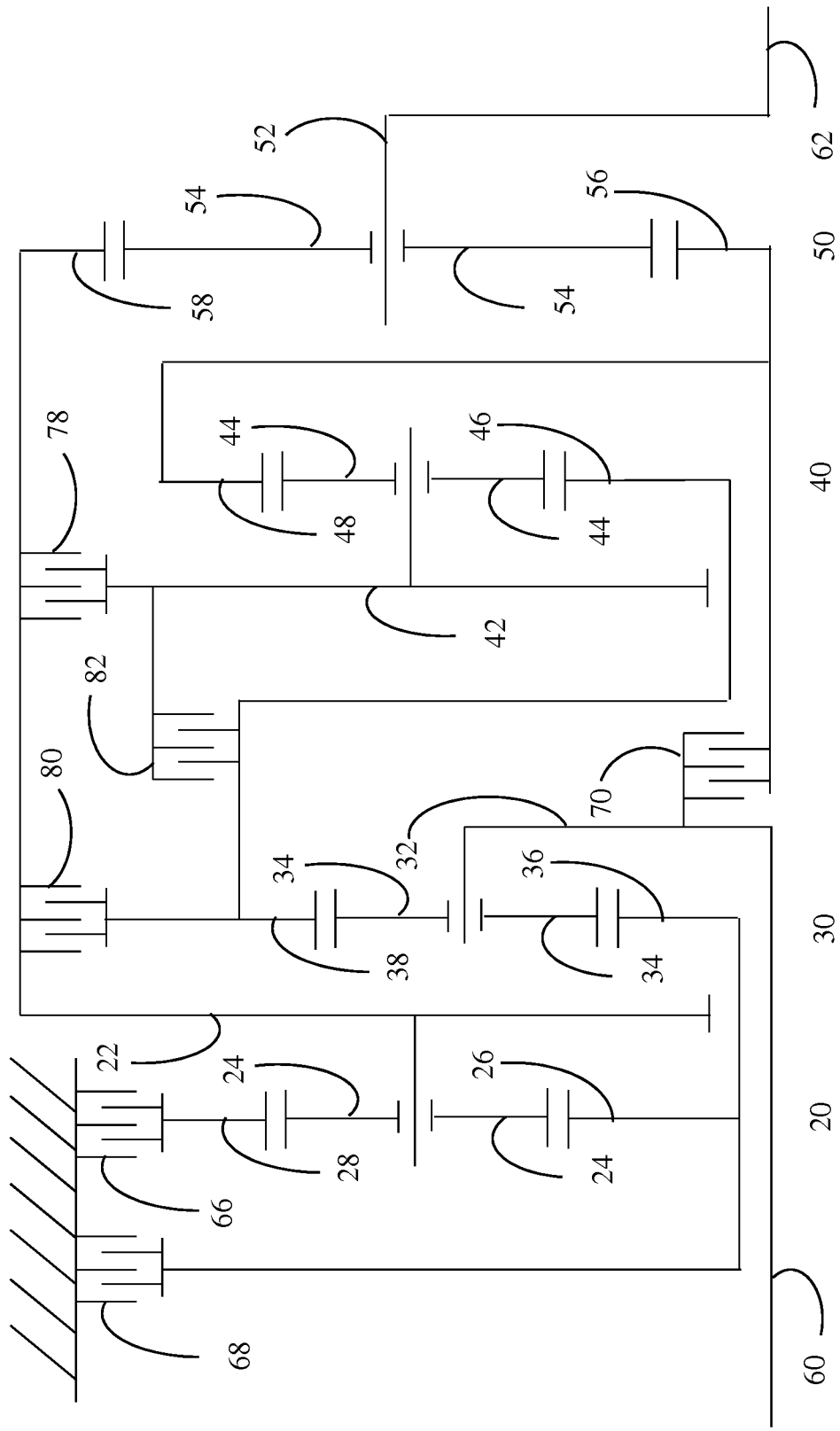
FIG. 3 is a schematic diagram of a third transmission gearing arrangement.

A third example transmission is illustrated in FIG. 3. In this transmission, clutch 78 selectively couples carrier 22 and ring gear 58 to carrier 42, clutch 80 selectively couples carrier 22 and ring gear 58 to ring gear 38 and sun gear 46, and clutch 82 selectively couples ring gear 38 and sun gear 46 to carrier 42. This module of three clutches, like the module of clutches 72, 74, and 76 in FIG. 1, permits the selective coupling any two of the three rotating elements. In the transmission of FIG. 1, selectively coupling two elements is accomplished by engaging two clutches, thereby coupling each element to intermediate shaft 64. In the transmission of FIG. 3, a single clutch is engaged to selectively couple two elements. As shown in Table 3, engaging the clutches and brakes of FIG. 3 in combinations of three establishes ten forward speed ratios and one reverse speed ratio between input shaft 60 and output shaft 62. When the gears have the same number of teeth as the corresponding gears in FIGS. 1 and 2, the resulting speed ratios are identical.

TABLE 3

| | 66 | 68 | 70 | 78 | 80 | 82 | Ratio | Step |
|---|---|---|---|---|---|---|---|---|
| Rev | X | X | | X | | | −4.79 | 102% |
| $1^{st}$ | X | X | X | | | | 4.70 | |
| $2^{nd}$ | X | X | | | | X | 2.99 | 1.57 |
| $3^{rd}$ | X | | X | | | X | 2.18 | 1.37 |
| $4^{th}$ | X | | | (X) | X | X | 1.80 | 1.21 |
| $5^{th}$ | X | | X | | X | | 1.54 | 1.17 |
| $6^{th}$ | X | | | X | X | | 1.29 | 1.19 |
| $7^{th}$ | | | X | X | X | (X) | 1.00 | 1.29 |
| $8^{th}$ | | X | X | X | | | 0.85 | 1.17 |
| $9^{th}$ | | X | X | | X | | 0.69 | 1.24 |
| $10^{th}$ | | X | | X | X | (X) | 0.64 | 1.08 |

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A transmission comprising:
   input, output, and intermediate shafts;
   a first planetary gear set having a first sun gear, a first ring gear, a first carrier fixedly coupled to the input shaft, and a set of planet gears in continuous meshing engagement with the first sun gear and the first ring gear;
   a second planetary gear set having a second sun gear, a second ring gear, a second carrier fixedly coupled to the output shaft, and a set of planet gears in continuous meshing engagement with the second sun gear and the second ring gear;
   a third planetary gear set having a third sun gear fixedly coupled to the first ring gear, a third ring gear fixedly coupled to the second sun gear, a third carrier, and a set of planet gears in continuous meshing engagement with the third sun gear and the third ring gear;
   a fourth planetary gear set having a fourth sun gear, a fourth ring gear, a fourth carrier, and a set of planet gears in continuous meshing engagement with the fourth sun gear and the fourth ring gear;
   a first clutch configured such that when the first clutch is engaged i) the intermediate shaft is coupled to the third carrier and ii) the second sun gear is coupled to the third ring gear;

a second clutch configured to selectively couple the first ring gear to the intermediate shaft;
a third clutch configured to selectively couple the input shaft to the second sun gear;
a fourth clutch configured to selectively couple the second ring gear to the intermediate shaft; and
a first brake configured to selectively hold the first sun gear against rotation.

2. The transmission of claim 1 further comprising a fifth clutch configured such that when the fifth clutch is engaged i) the fourth sun gear is coupled to the first sun gear ii) the fourth carrier is coupled to the second ring gear, and iii) the fourth ring gear is held against rotation.

3. The transmission of claim 2 wherein
the fourth sun gear is fixedly coupled to the first sun gear;
the fourth carrier is fixedly coupled to the second ring gear; and
the fifth clutch selectively holds the fourth ring gear against rotation.

4. The transmission of claim 1 wherein
the third carrier is fixedly coupled to the intermediate shaft; and
the first clutch selectively couples the third ring gear to the second sun gear.

5. The transmission of claim 1 wherein
the third ring gear is fixedly coupled to the second sun gear; and
the first clutch selectively couples the third carrier to the intermediate shaft.

6. A transmission comprising:
input, output, and intermediate shafts;
a first fixed gearing arrangement configured to constrain the input shaft to rotate at a speed between speeds of a first element and a second element;
a second fixed gearing arrangement configured to constrain the output shaft to rotate at a speed between speeds of a third element and a fourth element;
a third fixed gearing arrangement configured to constrain a fifth element to rotate at a speed between speeds of the second element and a sixth element;
a first shiftable gearing arrangement configured to selectively constrain the fourth element to rotate at a speed between zero and a speed of the first element;
a first clutch configured such that when the first clutch is engaged i) the intermediate shaft is coupled to the fifth element and ii) the third element is coupled to the sixth element;
a second clutch configured to selectively couple the second element to the intermediate shaft;
a third clutch configured to selectively couple the input shaft to the third element;
a fourth clutch configured to selectively couple the fourth element to the intermediate shaft; and
a first brake configured to selectively hold the first element against rotation.

7. The transmission of claim 6 wherein the first shiftable gearing arrangement comprises
a fourth fixed gearing arrangement configured to constrain the fourth element to rotate at a speed between speeds of the first element and a seventh element; and
a second brake selectively holding the seventh element against rotation.

8. The transmission of claim 6 wherein
the fifth element is fixedly coupled to the intermediate shaft; and
the first clutch selectively couples the sixth element to the third element.

9. The transmission of claim 6 wherein
the sixth element is fixedly coupled to the third element; and
the first clutch selectively couples the fifth element to the intermediate shaft.

10. A transmission comprising:
input and output shafts;
a first fixed gearing arrangement configured to constrain the input shaft to rotate at a speed between speeds of a first element and a second element;
a second fixed gearing arrangement configured to constrain the output shaft to rotate at a speed between speeds of a third element and a fourth element;
a third fixed gearing arrangement configured to constrain a fifth element to rotate at a speed between speeds of the second element and the third element;
a first shiftable gearing arrangement configured to selectively constrain the fourth element to rotate at a speed between zero and a speed of the first element;
a first clutch configured to selectively couple the input shaft to the third element;
a first brake configured to selectively hold the first element against rotation; and
a clutch module configured to selectively couple every combination of two of the second element, the fourth element, and the fifth element.

11. The transmission of claim 10 wherein the clutch module comprises
an intermediate shaft;
a second clutch configured to selectively couple the intermediate shaft to the second element;
a third clutch configured to selectively couple the intermediate shaft to the fourth element; and
a fourth clutch configured to selectively couple the intermediate shaft to the fifth element.

12. The transmission of claim 10 wherein the clutch module comprises
a second clutch configured to selectively couple the second element to the fourth element;
a third clutch configured to selectively couple the fourth element to the fifth element; and
a fourth clutch configured to selectively couple the fifth element to the second element.

13. The transmission of claim 10 wherein the first shiftable gearing arrangement comprises
a fourth fixed gearing arrangement configured to constrain the fourth element to rotate at a speed between speeds of the first element and a seventh element; and
a second brake selectively holding the seventh element against rotation.

14. A transmission comprising:
input and output shafts;
first, second, third, fourth, fifth, sixth, and seventh intermediate shafts;
a first brake configured to selectively hold the first intermediate shaft against rotation;
a second brake configured to selectively hold the third intermediate shaft against rotation;
a first clutch configured to selectively couple the fourth intermediate shaft to the seventh intermediate shaft;
a second clutch configured to selectively couple the fifth intermediate shaft to the seventh intermediate shaft;
a third clutch configured to selectively couple the input shaft to the sixth intermediate shaft; and
a fourth clutch configured to selectively couple the second intermediate shaft to the seventh intermediate shaft.

15. The transmission of claim 14 further comprising
- a first fixed gearing arrangement configured to constrain the second intermediate shaft to rotate at a speed between speeds of the first intermediate shaft and the third intermediate shaft;
- a second fixed gearing arrangement configured to constrain the input shaft to rotate at a speed between speeds of the first intermediate shaft and the fourth intermediate shaft;
- a third fixed gearing arrangement configured to constrain the fifth intermediate shaft to rotate at a speed between speeds of the fourth intermediate shaft and the sixth intermediate shaft; and
- a fourth fixed gearing arrangement configured to constrain the output shaft to rotate at a speed between speeds of the sixth intermediate shaft and the second intermediate shaft.

16. The transmission of claim 15 wherein the first fixed gearing arrangement comprises
- a first sun gear fixedly coupled to the fourth intermediate shaft;
- a first ring gear fixedly coupled to the sixth intermediate shaft;
- a first carrier fixedly coupled to the fifth intermediate shaft; and
- a set of planet gears in continuous meshing engagement with the first sun gear and the first ring gear.

17. The transmission of claim 15 wherein the second fixed gearing arrangement comprises
- a second sun gear fixedly coupled to the first intermediate shaft;
- a second ring gear fixedly coupled to the fourth intermediate shaft;
- a second carrier fixedly coupled to the input shaft; and
- a set of planet gears in continuous meshing engagement with the second sun gear and the second ring gear.

18. The transmission of claim 15 wherein the third fixed gearing arrangement comprises
- a third sun gear fixedly coupled to the fourth intermediate shaft;
- a third ring gear fixedly coupled to the sixth intermediate shaft;
- a third carrier fixedly coupled to the fifth intermediate shaft; and
- a set of planet gears in continuous meshing engagement with the third sun gear and the third ring gear.

19. The transmission of claim 15 wherein the fourth fixed gearing arrangement comprises
- a fourth sun gear fixedly coupled to the sixth intermediate shaft;
- a fourth ring gear fixedly coupled to the second intermediate shaft;
- a fourth carrier fixedly coupled to the output shaft; and
- a set of planet gears in continuous meshing engagement with the fourth sun gear and the fourth ring gear.

* * * * *